May 17, 1938.  C. B. SPASE  2,117,520

OPERATING MECHANISM FOR CLUTCHES

Original Filed April 11, 1933

INVENTOR:
Charles B. Spase,
BY
Bodell & Thompson
ATTORNEYS.

Patented May 17, 1938

2,117,520

UNITED STATES PATENT OFFICE 2,117,520

OPERATING MECHANISM FOR CLUTCHES

Charles B. Spase, Nedrow, N. Y., assignor to W. C. Lipe Inc., Syracuse, N. Y., a corporation of New York Application April 11, 1933, Serial No. 665,738
Renewed November 20, 1936

9 Claims. (Cl. 192—105)

This invention relates to clutches for motor vehicles for transferring the power of the engine to the drive wheels of the vehicle usually through a suitable transmission gearing, and has for its object a clutch and operating mechanism by which the clutch at the option of the driver works as an automatic or centrifugal clutch and as non-automatic controlled or operated by the driver. More specifically, the invention has for its object an automatic clutch having normally idle clutch spring means, and means operable at the will of the operator for cutting in or out the clutch spring means, that is, rendering the clutch spring means idle or ineffective, so that the clutch can be operated either as an automatic clutch or as a non-automatic clutch or one that must be thrown out by the operation of the operating lever or clutch pedal. It further has for its object an optionally automatic and a non-automatic clutch operating mechanism, but whereby, when automatic, the clutch may, if desired, be thrown out by the clutch pedal. It further has for its object a clutch construction in which the clutch spring means is located outside the clutch assembly. It further has for its object a mounting for the throw-out collar whereby when the clutch is operated automatically, the throw-out collar is free to play or idle during the automatic throwing-out and in of the clutch. It further has for its object a particularly simple and efficient mounting for a part of the throw-out mechanism whereby this part is non-rotatable and supported independently of the clutch shaft or from the front wall of the transmission gearing or rear wall of the clutch housing.

The invention consists in the novel features and in the combinations and constructions hereinafter set forth and claimed.

In describing this invention, reference is had to the accompanying drawing in which like characters designate corresponding parts in all the views.

Figure 1:
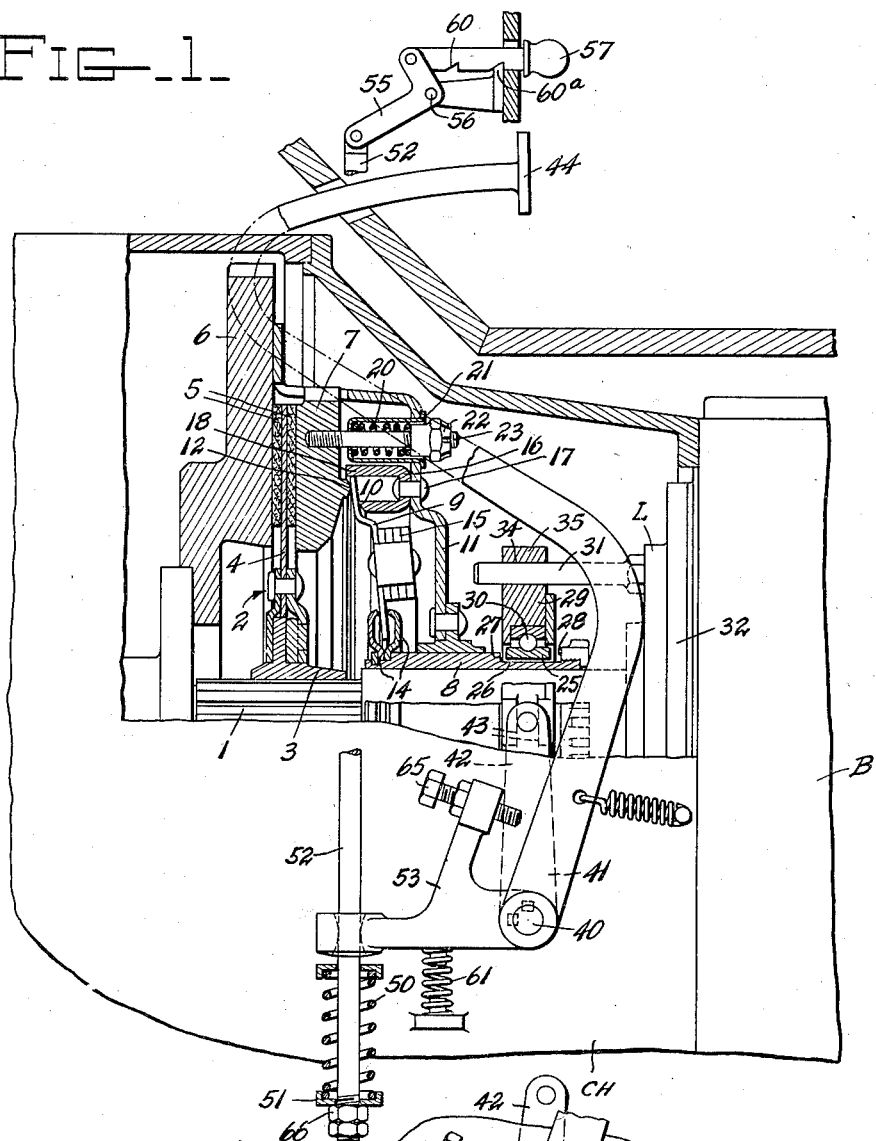
Figure 1 is a fragmentary side elevation, partly broken away, and with the clutch partly in section, of a clutch assembly embodying my invention, the operating mechanism being shown as in its position occupied when the clutch spring is idle or cut out.

This invention comprises, generally, clutch spring means operable at the option of the operator, alternately with the automatic or centrifugal means, for engaging and disengaging the clutch of a motor vehicle, a coupling operable to shift the spring into and out of effective or active position to engage the clutch, and means operable at the will of the operator for shifting the coupling to shift the spring out of effective position, whereby the clutch acts as an automatic clutch or into an effective position, where it acts as a non-automatic clutch and is controlled solely by the clutch pedal.

I have illustrated my invention as applied to the type of automatic clutch shown in my pending application Serial No. 602,888, filed April 4, 1932, although it may be applied to any form of automatic or centrifugally operated clutch.

1 designates the clutch shaft; 2 the shiftable or driven member of the clutch, this having a hub 3 splined on the shaft 1 and capable of shifting axially, within limits, thereon, and a disk 4 secured to the hub in any suitable manner and carrying facing disks 5 of friction material on opposite sides thereof, one facing disk coacting with the surface on the driving member 6 of the clutch which is usually the fly-wheel of the engine of the motor vehicle, and the other facing disk 5 coacting with an axially shiftable pressure member or ring 7.

8 is what is conventionally known as a throw-out sleeve or its equivalent shiftable axially of the clutch shaft 1. 9 designates one of an annular series of levers fulcrumed at 10 near their outer ends on a fulcrum carried by the back plate 11 of the clutch, thrusting at 12 at their outer ends against an annular fulcrum ring on the pressure ring 7 and coupled at their inner ends to the throw-out sleeve by suitable means, as a pair of collars 14 secured to the inner end of the throw-out sleeve 8, these collars 14 providing a groove in which the inner ends of the levers 9 extend. The levers move forwardly, that is, to the left (Figure 1) toward the plane of the fulcrum 10 to disengage the clutch and rearwardly away from said plane to engage the clutch and in order to make the operation of the clutch automatic, the inner arms of the levers, that is, the arms between the fulcrum 10 and inner ends of the levers, are provided with weights 15. The fulcrums 10 are provided at the edge of one flange of an annular channel-shaped piece 16, the intermediate portion of which is secured, as by rivets 17, to the back plate 11, and the other flange 18 of which extends around the extreme outer ends of the levers to prevent displacement thereof. The levers 9 are weighted sufficiently so that with a predetermined R. P. M. of the clutch, the weights will be thrown outwardly by the centrifugal action, causing the clutch to engage and will move inwardly at a speed below said R. P. M. to cause the clutch to disengage and during the operation of the levers by the weights 15, the throw-out sleeve 8 idles backwardly and forwardly. However, insofar as this invention is concerned, any other form of automatic clutch may be used.

20 designates one or more comparatively light springs tending to shift the pressure ring 7 out of engaged position against the centrifugal force of the weights 15 of the levers 9 when the clutch rotates at a speed below said predetermined R. P. M. Each spring 20 is here shown as located in a socket or thimble 21 suitably held in the back plate, and as thrusting at one end against the bottom of the thimble and at its other end against the head 22 of a screw 23 extending axially through the thimble and threading into the pressure ring 7.

25 is a throw-out collar slidable axially of the rear end of the throw-out sleeve 8, which rear end extends to the rear of the back plate 11, this being located in an annular channel 26 formed in the throw-out sleeve providing shoulders 27, 28, between which the throw-out collar 25 works.

29 is a yoke, or collar, for operating the throw-out collar 25, the collar 29 being non-rotatable. A suitable anti-friction bearing 30 is located between the collar 29 and the collar 25. The non-rotatable collar 29 is here shown as slidably mounted on studs as 31 which usually project from the rear wall of the clutch housing which is the front wall of the gear box B, or from the bearing cap 32 in the front wall of the gear box B. It will be understood that the stem gear or drive shaft of the transmission gearing is journalled in a removable bearing cap fixedly secured or bolted to the front wall of the transmission housing or gear box. The studs, or pins 31 are secured in any suitable manner to the bearing cap, and as here shown, the bearing cap is provided with diametrically opposite lugs at L to which the studs or pins 31 are secured, and these pins slidably fit bores 34 provided in similar lugs 35 on the collar 29.

The clutch here shown is of the push-in type. That is, the type in which the throw-out collar pushes in, or forwardly, toward the clutch to disengage it. It is here shown, when operated by the clutch pedal, as operated from a throw-out rock shaft 40 suitably mounted in the usual manner in the clutch housing CH or the bell between the fly wheel housing and the gear box B and having a yoke 41 thereon, the arms 42 of which thrust against or work between opposing bearing surfaces 43 provided on the collar 29. The shaft 40 is operated by the usual clutch pedal 44. When the clutch is operating as an automatic clutch, the throw-out collar 25 is normally arranged so that it is spaced apart from the shoulder 28 of the throw-out sleeve 8 a sufficient distance to permit the throw-out sleeve 8 to idle during the automatic operation of the clutch levers 9 under the centrifugal force. When, however, the clutch is being used as a non-automatic clutch, or under the influence of a clutch spring to hold the clutch engaged, the throw-out collar thrusts against the shoulder 28, it being caused to take this position by the clutch spring. When the throw-out collar 25 is operated by the clutch pedal 44, when being operated against the clutch spring, the collar 25 moves away from the shoulder 28 first relieving the throw-out collar of the force of the clutch spring, and then thrusts against the shoulder 27 positively actuating the sleeve 8 inward to shift the levers 9 to "out" position. When the clutch is being used as an automatic clutch it may be, if desired, disengaged by operating the clutch pedal 44 to cause the throw-out collar 25 to thrust against the shoulder 27 and shift, or push, the throw-out sleeve 8 inwardly.

In the illustrated embodiment of my invention, the clutch spring is shown as located outside of the clutch assembly, or outside the portion of the clutch carried by the back plate 11 and the clutch shaft 1, and it may be located inside or outside of the clutch housing or bell CH.

Figure 2:
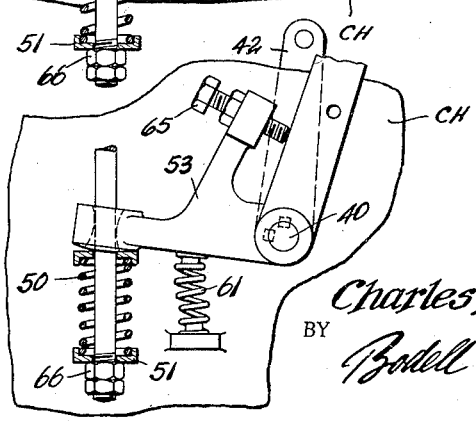
Figure 2 is a fragmentary elevation of parts seen in Figure 1 showing the position of the operating parts when the clutch spring is cut in or in active, effective position.

50 designates the clutch spring, this being shown as a compression spring interposed between an abutment 51 on a rod or shiftable carrier 52, and a lever 53 mounted on the clutch pedal shaft 40 and connected to the clutch pedal 44 to transmit motion thereto so that the force of the spring 50, when in active position, or the position shown in Figure 2, will be applied through the yoke 41, and throw-out collar 25, and throw-out sleeve 8, to the levers 9, to shift them to the right, Figure 1, and hold the clutch engaged. The abutment 51 is shiftable to disconnect, cut out or render ineffective, the spring 50, and as here shown, the carrier or rod 52, which carries the abutment 51, is shiftable for this purpose by means located within the reach of the driver, it being usually located on the instrument board of a motor vehicle. The rod 52, as here shown, is connected at its upper end to a lever 55 pivoted at 56 to the instrument board, the lever being connected to a suitable manual 57 and operable from the instrument board and held in its operated position in any suitable manner. The manual 57 is shown as pivoted to the lever 55 and shiftable with its pivot to engage either of two notches or teeth 60, with a stationary tooth 60a.

In the illustrated embodiment of my invention, the clutch pedal 44 is loosely or rotatably mounted on the shaft 40 and its motion is transferred to the throw-out collar through the lever 53, which is keyed or otherwise secured to the shaft 40 and the lever 53 is spring pressed to cause an adjustable abutment, as a set screw thereon, to press against the clutch pedal 44 when the clutch is acting as an automatic clutch. The set screw is adjustable to take up wear of the clutch or the friction disks thereof. The clutch spring 50 holds the lever 53 against the clutch pedal 44 to transmit motion thereto and to receive motion therefrom when the clutch is being used as a non-automatic one. Also, a suitable returning spring is attached to the clutch pedal. 61 designates the spring for holding the lever 53 in juxtaposition to the clutch pedal 44 when the clutch is being used as an automatic one, this spring 61 being here shown as interposed between a lug or bracket on the bell housing CH and the lever 53, and primarily acts to hold the lever 53 or the set screw against the clutch pedal, but it is also so located so as to permit the lever to move away from the clutch pedal and forms a clearance between the set screw and the pedal, when the clutch is working as an automatic one, to prevent motion from being transferred to the clutch pedal in the event the shoulder 27 does engage the throw-out collar during the automatic action. When the clutch spring 50 is shifted into effective position, it lifts the lever 53 away from the spring 61 and moves an adjustable stop or set screw 65 against the clutch pedal, taking up the normal clearance present when the clutch is being used as an automatic clutch. The tension of the spring 50 is adjustable in any suitable manner as by a nut 66 threading on the lower end of the rod 52 to lower or raise the spring abutment adjacent said nut, and the nut is held in its adjusted position in any suitable manner as by a lock nut.

In the illustrated embodiment of my invention, the lever 53 and spring 50 are located on the outside of the bell housing CH where they are readily accessible but, if desired, may be located inside of the housing. The spring 61 is in effect a yielding stop for holding the lever 53 or its set screw 65 from falling too far away from the clutch pedal 41 when the rod 52 is operated to unload or to move the clutch spring 50 to its inoperative position, the spring or yielding stop 61 permitting the lever 53 to move additionally when the clutch pedal 41 is used to disengage the clutch when the clutch is working as an automatic clutch. In other words, the spring or yielding stop 61 is used to maintain a predetermined clearance between the lever 53 or the set screw 65 and the lever 44 when the clutch is working as an automatic clutch and the spring 50 is unloaded.

When the clutch is being used as an automatic clutch, the manual 57 is shifted inwardly to permit the rod 52 to move the abutment 51 downwardly and release the lever 53 of the pressure of the spring 50, and the movement of the lever 53 is limited by the spring 61.

In operation, when the clutch is being used as an automatic clutch, the shoulder 51 and rod 52 are shifted by means of the handle 57 into the position shown in Figure 1, but it will be obvious that the clutch can be thrown out by the clutch pedal. When the clutch is being used as a non-automatic clutch, that is, held engaged by the clutch spring, the abutment 51 and rod 52 are shifted into their position shown in Figure 2 by the operation of the handle 57, in which case, the force of the clutch spring 50 is applied to the throw-out collar 25 to hold the clutch engaged through the lever 53, yoke 41, and throw-out collar 25, and upon the depression of the foot pedal, the throw-out collar 25 is relieved of the action of the clutch spring 50, so that the clutch will be released upon depression of the clutch pedal.

What I claim is:

1. In a clutch including a throw-out collar operable to disengage the clutch, an operating lever for operating the throw-out collar to disengage the clutch and centrifugal means for automatically throwing in the clutch at a predetermined R. P. M. and for throwing out the clutch at less than said predetermined R. P. M. and independently of the operating lever; the combination of clutch spring means acting, when effective, to hold the clutch engaged and means operable at the option of the operator independently of the operating lever for connecting and disconnecting the spring means into and out of effective connection with the throw-out collar, said spring means being located outside of the clutch assembly.

2. In a clutch for motor vehicles including centrifugal means for automatically engaging and disengaging the clutch at a predetermined R. P. M., a throw-out sleeve, and a throw-out collar, a clutch spring effective on the throw-out collar to hold the clutch engaged and a clutch pedal operable to operate the throw-out collar against the action of the spring to disengage the clutch, the combination of said throw-out sleeve having opposing spaced apart shoulders and said throw-out collar working between said shoulders and spaced apart from the same and movable into engagement therewith, and connections between the clutch pedal and the throw-out collar, said pedal being operable to disengage the clutch independently of the centrifugal means, and means operable at the will of the operator independently of the clutch pedal for relieving the throw-out collar of the action of the clutch spring.

3. In a clutch for motor vehicles including centrifugal means for automatically engaging and disengaging the clutch at predetermined R. P. M., a throw-out sleeve, and a throw-out collar, the combination of said throw-out sleeve having opposing spaced apart shoulders and said throw-out collar being movable between said shoulders and movable into engagement with one of the said shoulders to disengage the clutch independently of the centrifugal means and being normally spaced from said shoulder to permit working of the sleeve during the centrifugal action, a clutch spring acting to press the throw-out collar against the other shoulder, a clutch pedal, motion transmitting connections between the clutch pedal and the throw-out collar and means independent of the clutch pedal and operable at the will of the operator for connecting and disconnecting the clutch spring into and out of effective connection with said collar.

4. In a clutch for motor vehicles including centrifugal means for automatically engaging and disengaging the clutch at a predetermined R. P. M., a throw-out collar member and a clutch pedal member and connections between said members whereby the motion of the clutch pedal, when operated, is transferred to the throw-out collar member, the combination of a clutch spring acting on one of said members to engage the clutch, the spring being shiftable bodily into and out of engagement with the member on which it acts, and operator-operated means for shifting the spring.

5. In a clutch for motor vehicles including centrifugal means for automatically engaging and disengaging the clutch at a predetermined R. P. M., a throw-out sleeve, a throw-out collar member for coacting with the sleeve, a clutch pedal member and connections between said members whereby the motion of the clutch pedal, when operated, is transferred to the throw-out collar member, the combination of a clutch spring acting on one of said members to engage the clutch, the spring being shiftable bodily into and out of engagement with the member on which it acts, and operator-operated means for shifting the spring into and out of effective connection with the member on which the spring acts, the throw-out collar member being connected to the throw-out sleeve by a lost motion connection permitting working of the throw-out sleeve relatively to the throw-out collar member during the automatic centrifugal action of the clutch, and the clutch spring, when shifted, to carry the clutch spring into effective position serving to take up said lost motion.

6. In a clutch for motor vehicles including centrifugal means for automatically engaging and disengaging the clutch at a predetermined R. P. M., a throw-out sleeve, a throw-out collar and a clutch pedal operable to shift the collar to operate the clutch independently of the centrifugal means, the combination of a clutch spring, connections between the spring and the throw-out collar, the spring acting on the throw-out collar through said connections and means independent of the clutch pedal and operable at the will of the operator for shifting the spring into and out of effective connection with said connections.

7. In a clutch for motor vehicles including centrifugal means for automatically engaging and disengaging the clutch at a predetermined R. P. M., a throw-out sleeve, a throw-out collar, the combination of said sleeve having spaced apart shoulders, and the throw-out collar located between said shoulders and thrusting, when operated, against one of said shoulders for disengaging the clutch, a clutch pedal, connections between the clutch pedal and the throw-out collar, to operate the latter, a clutch spring acting on said collar through said connections to thrust the collar against the other shoulder to hold the clutch engaged, and means independent of the clutch pedal and operable at the will of the operator for shifting the spring into and out of effective connection with said connections.

8. In a clutch including a throw-out collar, the combination with a clutch pedal and connections between the pedal and the throw-out collar, of a lever arm movable with the clutch pedal, a clutch spring, an abutment therefor opposed to said lever arm, the clutch spring being interposed between the abutment and the lever arm, and means for shifting the abutment relatively to the lever to relieve the clutch pedal of the force of the spring and to apply the spring through said lever arm to the pedal.

9. In a clutch including a throw-out collar operable to disengage the clutch, an operating lever for the throw-out collar, and centrifugal means for automatically throwing in the clutch at a predetermined R. P. M. and for throwing out the clutch at less than the predetermined R. P. M., and independently of the operating lever; the combination of clutch spring means acting on the collar to hold the clutch engaged and means independent of the operating lever and operable at the option of the operator for bodily shifting the spring means into and out of effective connection with the throw-out collar.

CHARLES B. SPASE.